US010269022B2

United States Patent
O'Neill et al.

(10) Patent No.: US 10,269,022 B2
(45) Date of Patent: *Apr. 23, 2019

(54) SYSTEM FOR VERIFYING AN ITEM IN A PACKAGE USING A DATABASE

(71) Applicant: TruTag Technologies, Inc., Honolulu, HI (US)

(72) Inventors: Michael P. O'Neill, Kaneohe, HI (US); Peter Pearson, Aptos, CA (US); Ting Zhou, Orinda, CA (US); Timothy Learmonth, Berkeley, CA (US)

(73) Assignee: TruTag Technologies, Inc., Kapolei, HI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/482,974

(22) Filed: Sep. 10, 2014

(65) Prior Publication Data
US 2015/0060548 A1 Mar. 5, 2015

Related U.S. Application Data

(63) Continuation of application No. 13/158,251, filed on Jun. 10, 2011, now Pat. No. 8,881,972.

(60) Provisional application No. 61/354,635, filed on Jun. 14, 2010.

(51) Int. Cl.
G06K 7/10 (2006.01)
G06Q 10/08 (2012.01)
G06Q 30/00 (2012.01)

(52) U.S. Cl.
CPC .......... *G06Q 30/0185* (2013.01); *G06K 7/10* (2013.01); *G06Q 10/08* (2013.01); G06K 2007/10504 (2013.01)

(58) Field of Classification Search
CPC .. C12Q 1/6813; C12Q 2563/185; B41M 3/14; B41M 3/144; G01G 19/4144; G06K 19/06046; G06K 19/086; G06K 19/10; G06K 19/14; G06K 7/12; G06K 9/00; G07F 7/086
USPC ......................................... 235/454
See application file for complete search history.

(56) References Cited

U.S. PATENT DOCUMENTS 6,535,637 B1 * 3/2003 Wootton ................. B65B 57/00
221/102
6,592,033 B2 * 7/2003 Jennings et al. ............... 235/385
6,612,494 B1 * 9/2003 Outwater ................. 235/462.04
(Continued)

FOREIGN PATENT DOCUMENTS

WO 03079267 A2 9/2003

*Primary Examiner* — Thien M Le
*Assistant Examiner* — Tae W Kim
(74) *Attorney, Agent, or Firm* — Van Pelt, Yi & James LLP

(57) ABSTRACT

A system for verifying an item in a package using a database comprises a database and a verifier. A package producer provides the database with an identifier for one or more items each of a type, wherein the package producer produces a package, where the package includes the one or more items each of the type with an associated one or more selected tag identifiers that are placed in a location on an item of the one or more items. The verifier verifies the one or more items of the type using 1) the associated one or more selected tag identifiers as detected using a spectral signature or 2) a tag characteristic as detected using an imager, and 3) the identifier retrieved from the database.

28 Claims, 3 Drawing Sheets

(56) References Cited

U.S. PATENT DOCUMENTS

| | | | |
|---|---|---|---|
| 7,303,123 B2* | 12/2007 | Roberts | G06Q 10/087 235/383 |
| 2004/0112962 A1* | 6/2004 | Farrall | G06K 7/12 235/462.01 |
| 2006/0019409 A1* | 1/2006 | Nelson et al. | 436/524 |
| 2006/0086791 A1* | 4/2006 | Austin | 235/385 |
| 2006/0283931 A1 | 12/2006 | Polli et al. | |
| 2007/0119951 A1 | 5/2007 | Auslander et al. | |
| 2007/0148695 A1* | 6/2007 | Sailor et al. | 435/7.1 |
| 2007/0219916 A1 | 9/2007 | Lucas | |
| 2008/0177568 A1 | 7/2008 | Kotidis | |
| 2010/0081921 A1* | 4/2010 | Urban et al. | 600/424 |

\* cited by examiner

SYSTEM FOR VERIFYING AN ITEM IN A PACKAGE USING A DATABASE

CROSS REFERENCE TO OTHER APPLICATIONS

This application is a continuation of co-pending U.S. patent application Ser. No. 13/158,251, entitled SYSTEM FOR VERIFYING AN ITEM IN A PACKAGE USING A DATABASE filed Jun. 10, 2011 which is incorporated herein by reference for all purposes, which claims priority to U.S. Provisional Application No. 61/354,635, entitled SYSTEM FOR VERIFYING AN ITEM IN A PACKAGE USING A DATABASE filed Jun. 14, 2010 which is incorporated herein by reference for all purposes.

BACKGROUND OF THE INVENTION

A producer or reseller of items (including ingredients and components of such items)—for example a manufacturer, but also including other parties in the entire supply and distribution chain such as a supplier, a wholesaler, a distributor, a repackager, and a retailer—especially, but not limited to, high-value items, faces counterfeiting of the item. Counterfeiting includes the substitution, dilution, addition or omission of ingredients or components of the item compared to its intended product specification, as well as misrepresentation or diversion of the packaged item from its intended course of sale. This leads to loss of potential revenue as counterfeit items are sold in the place of the real item. Also, there can be health or product related damages caused by not using an authentic item as opposed to a counterfeit—for example, the counterfeit can perform differently or not at all as compared to an authentic item. This is particularly acute in industries that can affect health and safety such as industries involved with pharmaceuticals, nutritional supplements, medical devices, food and beverages, construction, transportation, and defense.

As international criminal organizations become more sophisticated, existing packaging security is proving inadequate. The complexity of many industry supply chains—for example, the supply chain of the pharmaceutical industry—lends itself to entry points for adulterated or counterfeit product(s), often found in carefully counterfeited and high-quality packaging, and sometimes in authentic packaging that has either been stolen or as part of a repackaging operation.

In complex product supply chains and markets with variable pricing, opportunities for arbitrage exist for unscrupulous parties to misrepresent product pricing without any change to the underlying product, and thus benefit monetarily, for example, as in returns, rebate or charge-back fraud. Monetary gain or loss to either side of a transaction may also result from errors in record-keeping.

In addition to counterfeiting or product misrepresentation, items that appear physically identical or similar, for example certain nutritional supplements, may actually contain different ingredients or components, but because of similar appearance may be unintentionally packaged or labeled incorrectly. Even if the items are otherwise identical, they may have different properties associated with the particular lot or batch conditions; for example, pharmaceuticals that otherwise appear identical may have different expiration dates and be incorrectly labeled due to failures or limitations in quality assurance protocols to ascertain such differences.

For product development and research, it may be beneficial at times to study and authenticate performance of items that appear identical but are made differently to learn whether or how those differences affect an end use. At times, it is important in such studies—for example in clinically masked (or 'blind') studies leading to pharmaceutical development—to be able to confidently identify the underlying item without revealing the true identity to study participants. In the case of pharmaceutical development and clinical trials, item-level identity error may be introduced, for example, at the contract research organization that repackages the various product formulations into masked unit-doses. Much time, cost, and effort goes into statistical sampling and chemical analyses to verify the true identity of the unit-doses that are ultimately administered.

In the effort to attain positive health outcomes in a more cost-effective and timely manner, healthcare providers need to focus on the adherence to health regimens, not just the efficacy of specific drugs. Understanding when, where and how often medicine is prescribed by a doctor, accurately and timely dispensed from a pharmacy, received by a patient, and consumed by the patient is helpful in understanding and verifying the effectiveness of the overall health regimen. Recording and collecting the data for appropriate analysis and study while also being able to confirm the underlying identity of the medicine at each stage is important to the reliability of the information collected.

BRIEF DESCRIPTION OF THE DRAWINGS

Various embodiments of the invention are disclosed in the following detailed description and the accompanying drawings.

DETAILED DESCRIPTION

Figure 1:
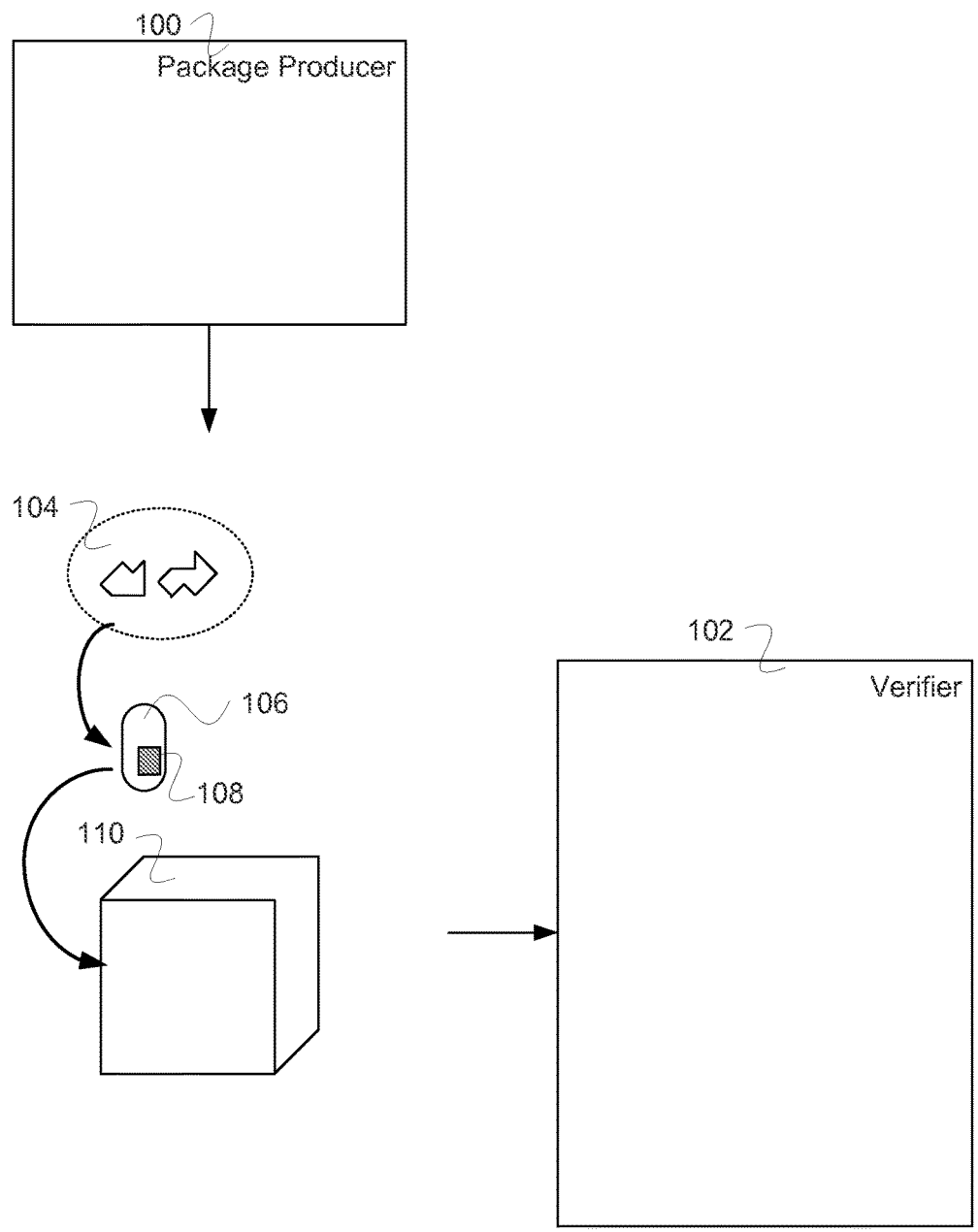
FIG. 1 is a block diagram illustrating an embodiment for a system for verifying an item in a package.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for verifying an item in a package is disclosed. The system comprises a package producer and a verifier. The package producer produces a package with a type of item contained within it. The package includes one or more items of the type that is associated with one or more tag identifiers that are placed in a location on the item. The verifier verifies the one or more items using 1) the associated one or more selected tag identifiers as detected using a spectral signature or 2) the location and/or shape of the tag identifiers on the item as detected using an imager, and 3) a database of identifiers with associated spectral, location and/or shape information.

In various embodiments, the database entries comprise information about the packaged items (hereby denoted goods information or goods info) that is useful to authenticate with the item. For example, goods info for medicines may contain dosage information, expiration dates, lot numbers, etc. Goods information may comprise different types of information depending on the associated item—for example, ingredient(s), stock keeping unit (SKU) number, identifier, physical characteristic (e.g., weight, dimension, volume, etc.), nutrition information, etc.

In some embodiments, in the database implementation, there is no need for keys or digital signatures. What happens is that the tags are used to create a unique marker ID, and that marker ID corresponds to a database entry containing goods info. There is no need for encryption because the marker ID to goods info relationship is already random, and since we control the database there is no way for an attacker to alter that version of goods info. So the verification would be 1. read goods info on package 2. use marker ID listed in goods info to check in database that the rest of goods info is not altered. 3. if 2 checks out, then use the spectrum and shape info to recompute marker ID and make sure that it is within error bounds of the marker ID stored in goods info.

In various embodiments, the package contains items of a type all having the same types of identifiers (e.g., one or more tags), the package contains one type of item identified with one identifier for the one type of item, or any other appropriate mapping of identifier(s) and/or item type, or any appropriate item or type of item. For example, each item (e.g., an individual art piece) has an individually identifiable set of tags or each type of item (e.g., all art pieces of a series of art pieces, a series of lithographic reproductions, etc.) has the same tag. So, that either each individual item is identifiable because it has a different tag, or all the items of the same type have the same tag so that the items of the type cannot individually be told apart but instead can be differentiated from other types of items (e.g., vitamin C tablets as opposed to vitamin D, or a low-dose type of medicine opposed to its higher-dose counterpart, etc.).

In various embodiments, the package comprises a pharmaceutical package that includes one or more solid oral dosage forms (SODFs: e.g., tablets, capsules, caplets, powders, crystals, and thin films), liquids (e.g. creams, gels, liniments, balms, lotions, injectables, and ointments), and/or any other appropriate medicines. The medicines have an added tag identifier that is added into the outer coating, is distributed on the outer layer of an uncoated medicine (e.g., a SODF), is distributed throughout a SODF or liquid, or any other appropriate manner of adding a tag identifier. In some embodiments, the tag comprises a rugate filter. In some embodiments, the physical placement is used for identification for example, the tags are laid out in a shape (e.g., a circle, a square, etc.) or a pattern (e.g., checkerboard, bar code, etc.) that is detectable using an imaging device. In some embodiments, the shape or shapes of one or more than one of the tags themselves are characterized and the characterization is used for identification. In some embodiments, the verifier measures the location of one or more tags on an item or label, and from the tag locations and/or shapes produces a spectral signature by means of an algorithm. In some embodiments, the algorithm uses the relative arrangement and/or shape of multiple tags with or without a fiduciary mark to produce a single item spectral signature. In some embodiments, the algorithm produces a spectral signature from the location and/or shape of each tag, and then combines the spectral signatures from more than one tag on an item into a single spectral signature. In some embodiments, the algorithm produces multiple spectral signatures derived from the location and/or shape of one or more tags. In some embodiments, the verifier produces a single spectral signature from the location and/or shape of one or more tags. For example, the use of a tag shape or combination of tag shapes, the placement of one or more tags in a pattern or arrangement or the relative locations of the one or more tags, or the spectral signature of a tag or of more than one tag are used alone or in combination to determine whether or not an item marked with the tag(s) is the authentic item.

In various embodiments, the package comprises a pharmaceutical package that includes one or more pills, liquids, test strips, transdermal patches or any other appropriate medicines or medical devices. The medicines have an added tag identifier that is added into the outer coating, is distributed on the outer layer of an uncoated medicine (e.g., a pill), is distributed throughout a pill or liquid, or any other appropriate manner of adding a tag identifier. In various embodiments, the package comprises an item for example, an electronic chip, sub-component, medical devices, an automobile or airplane part, building or material supplies, clothing, toys, cosmetics, jewelry, watches, works of art, currency, tickets, official identification documents, wine, or gourmet food. In some embodiments, the tag comprises a rugate filter. In some embodiments, the physical placement is used for identification—for example, the tags are laid out in a shape (e.g., a circle, a square, etc.) or pattern (e.g., checkerboard, bar code, etc.) that is detectable using an imaging device. In some embodiments, the shape or shapes of one or more than one of the tags themselves are characterized and the characterization is used for identification. In some embodiments, individual tag placement is partially variable due to inclusion of a random or pseudorandom step in the tag placement process, allowing unique or nearly unique tag placement for each cluster of tags. In some embodiments, the verifier measures the location of one or more tags on an item or label, and from the tag locations and/or shapes produces a spectral signature by means of an algorithm. In some embodiments, the algorithm uses the relative arrangement and/or shape of multiple tags with or without a fiduciary mark to produce a single item spectral signature. In some embodiments, the algorithm produces a spectral signature from the location and/or shape of each tag, and then combines the spectral signatures from more than one tag on an item into a single spectral signature. In some embodiments, the algorithm produces multiple spectral signatures derived from the location and/or shape of one or more tags. In some embodiments, the verifier produces a single spectral signature from the location and/or shape of one or more tags. For example, the use of a tag shape or combination of tag shapes, the placement of one or more tags in a pattern or arrangement or the relative locations of the one or more tags, or the spectral signature of a tag or of more than one tag are used alone or in combination to determine whether or not an item marked with the tag(s) is the authentic item.

In some embodiments, tags are made of the silica (deemed "generally recognized as safe"—or GRAS—by the FDA), rendering them biologically inert and edible. Each barely visible tag contains a custom-manufactured spectral signature chosen from over one billion possibilities, yet each item costs only fractions of a penny to label. The unique optical signature of each tag can be read by a low cost scanner and be linked to a database entry, where additional information about the item is stored, such as referencing a future e-pedigree track-and-trace system. Tags comprise a silicon wafer that is etched to have a spectral code encoded by the etching. The wafer is divided into small tags, and the resultant tags contain a complex porous nanostructure that is programmed during electrochemical synthesis to display a unique reflectivity spectrum. The tags are then oxidized by a high-temperature bake step to turn the crystalline, nanoporous silicon tags into amorphous, nanoporous silica. This bake step stabilizes the nanoporous structure against further oxidation (thus stabilizing the spectral signature) and provides for the tags to be characterized as a GRAS excipient. The spectrum is measured via a simple, low-cost spectrometer-based reader, then quickly verified against other information stored in a database such that the medicine and item appearance are authenticated together; tampering with either item or the item appearance would flag a security violation. The tags can also be used on their own acting simply as labels for quality assurance or other purposes. Information capacity is projected to potentially reach one trillion possible unique spectra, using peak number, peak placement, peak rugate phase, and/or peak amplitude as modulation parameters. The tags are passive, inconspicuous and can be attached to the outside of medicines or food products to be read, for example, through clear or translucent plastic blister packs, or mixed into medicines or food as a forensic excipient, to be read as part of an investigation or inspection process by authorized security or quality assurance personnel.

In some embodiments, the tag properties comprise:
More than one billion codes available
Inconspicuous size range (20 µm to 150 µm) allows covert or semi-covert use
Made from clear, high purity silica rendering them biologically inert and edible
High temperature resistance—melting point above 1600° C.
Passive—no energy input or output
Can be used in or on a product, package, label, or security fiber
Can be applied via sprays, coatings, inks, varnishes, or as part of laminate
Can be integrated at a number of manufacturing stages
High level of security possible using random tag shapes; security can be scaled to suit specific product needs
Can be made self-authenticating and reduce the costs and security risks associated with online databases and maintenance
Each piece of the silica microtag contains the coded information, useful for forensics In some embodiments, a system for verifying an item in a package using a database comprises a database and a verifier. A package producer provides the database with an identifier for one or more items each of a type, wherein the package producer produces a package, where the package includes the one or more items each of the type with an associated one or more selected tag identifiers that are placed in a location on an item of the one or more items. The verifier verifies the one or more items of the type using 1) the associated one or more selected tag identifiers as detected using a spectral signature or 2) a tag characteristic as detected using an imager, and 3) the identifier retrieved from the database.

In some embodiments, a package comprises one or more items of a type and one or more selected tag identifiers. Each item of the one or more items of the type is associated with the one or more selected tag identifiers, wherein the one or more selected tag identifiers are placed in a location on the item, wherein an identifier that is determined based at least in part on the plurality of selected tag identifiers, the location on the item, and information regarding the one or more items of the type is provided to a database. The one or more items are placed in the package.

FIG. 1 is a block diagram illustrating an embodiment for a system for verifying an item in a package. In the example shown, package producer 100 produces item 106 with associated tags (e.g., tags 104) placed on item 106 in a placement 108. In some embodiments, tags 104 are produced in a batch and selected for being associated with all items (e.g., item 106). In some embodiments, tags are selected based on a tag shape or a characteristic of a tag shape (e.g., a roughness, a size, a shape, etc.). Items are placed in packaging 110. In various embodiments, a database includes encoded information of one or more of the following: item type, item potency, item name, item stock keeping unit number, spectral response of the tag associated with the item, item shape, tag shape(s), tag placement information, item usage information, or any other appropriate information.

Verifier 102 also reads tags 104 using a spectral reader of verifier 102. Tag shape and/or tag placement is read using an imager of verifier 102. Verifier 102 verifies the authenticity of item 106 using information in a database, spectral reading of tags, tag shape and/or tag placement information, or any other appropriate information. Linkages of the information in the database, information encoded in the tag, information encoded in the placement, are formed so that incorrect components are detected (e.g., any tampering or substitution is detected).

Figure 2:
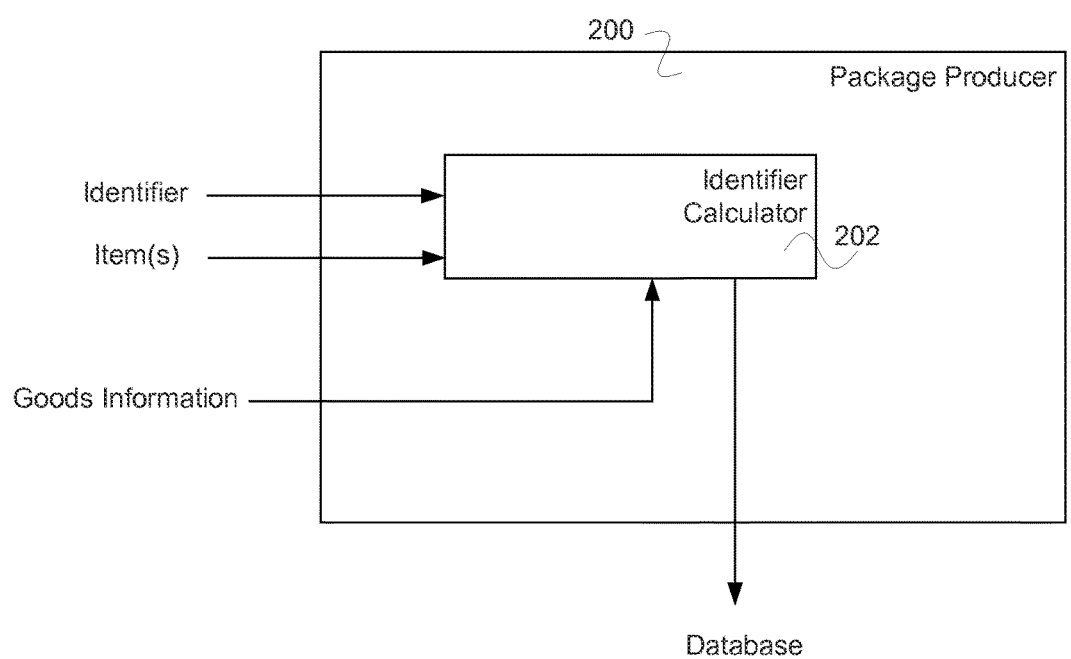
FIG. 2 is a block diagram illustrating an embodiment of a package producer.

FIG. 2 is a block diagram illustrating an embodiment of a package producer. In some embodiments, package producer 200 is used to implement package producer 100 of FIG. 1. In the example shown, package producer 200 comprises identifier calculator 202. Identifier calculator 202 receives an identifier (e.g., tag(s)) and item(s) and goods information and calculates the identifier to the item(s). The identifier to the item(s) is provided to the database. In various embodiments, item(s) and goods information are also provided to the database. In some embodiments, the identifier is at least partially determined by using one or more tag spectra and a number encoded in the reflectance spectra of the measured tags. By measuring the number and/or positions and/or other attributes of engineered reflectance peaks in each spectrum, an encoded number is derived (e.g., by using a predetermined mapping between the measured peaks and the encoded number). In some embodiments, the identifier is at least partially determined by using an image of one or more tags. For example, by measuring the presence or absence of a tag in an inferred grid defined by printed fiduciary printed marks, and creating a number from the grid by considering the presence of a tag as a 1 and the absence of a tag as 0, and concatenating each separate row in the grid into a single row, which can be seen as a binary number. The unique number is then combined with the reflectance-derived number, either by concatenation or another mathematical process, to create a unique identifier, or marker identifier (e.g., a marker ID). The database contains the marker ID and goods info.

Figure 3:
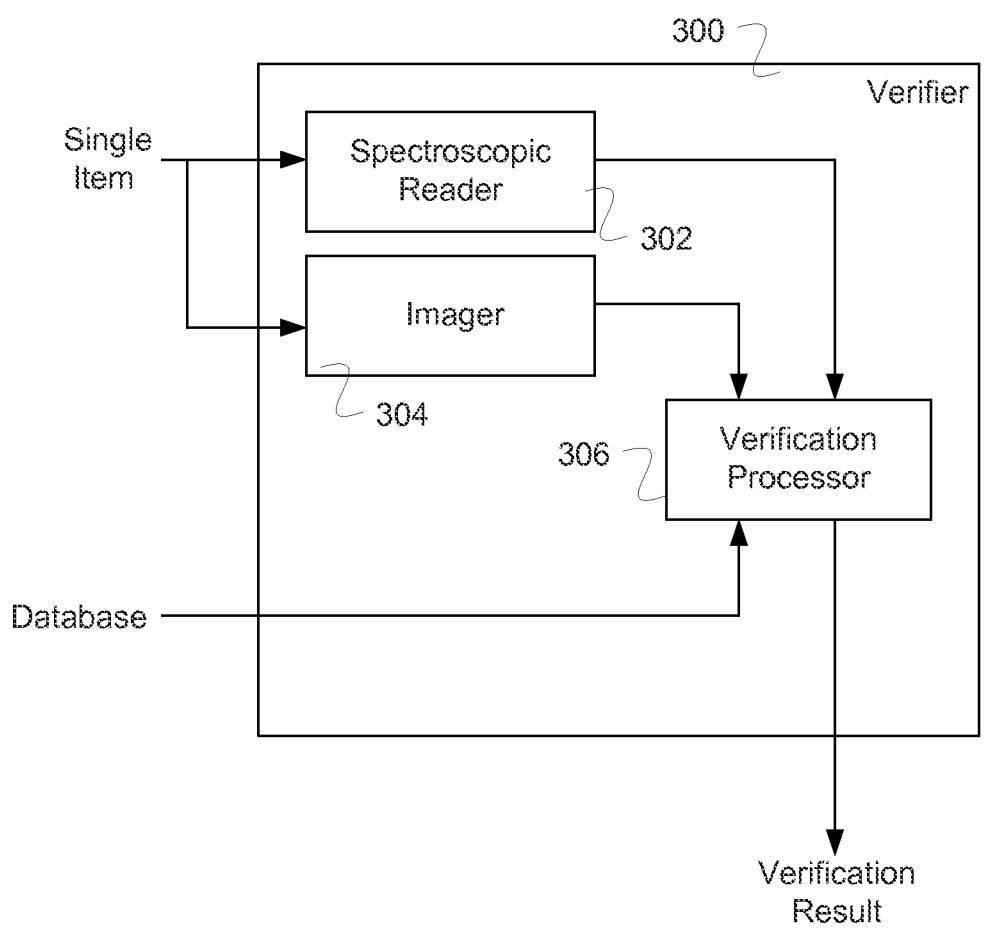
FIG. 3 is a block diagram illustrating an embodiment of a verifier.

FIG. 3 is a block diagram illustrating an embodiment of a verifier. In some embodiments, verifier 300 is used to implement verifier 102 of FIG. 1. In the example shown, verifier 300 comprises spectroscopic reader 302, imager 304, and verification processor 306. Spectroscopic reader 302 reads a scope of tags associated with an item. Imager 304 images an item and/or the placement of tags and/or the shape of tags. Information from spectroscopic reader 302 and imager 304 is input to verification processor 306 along with goods information. The verification processor 306 computes the marker ID. For example, first spectroscopic reader 302 reads one or more tag spectra and outputs a number encoded in the reflectance spectra of the measured tags. By measuring the number and/or positions and/or other attributes of engineered reflectance peaks in each spectrum, the encoded number is derived (e.g., by using a predetermined mapping between the measured peaks and the encoded number). Imager 304 captures an image of the marker and outputs a unique number related to the image. For example, by measuring the presence or absence of a tag in an inferred grid defined by printed fiduciary printed marks, and creating a number from the grid by considering the presence of a tag as a 1 and the absence of a tag as 0, and concatenating each separate row in the grid into a single row, which can be seen as a binary number. The unique number is then combined with the reflectance-derived number, either by concatenation or another mathematical process, to create a unique marker ID. The marker ID stored as part of goods info is then used to check the database. If the goods info matches the goods info read from the database, initial verification is indicated. Otherwise, a verification failure is indicated. If the goods infos match, the verification processor 306 uses the information from the spectroscopic reader 302 and imager 304 to compute the marker ID. If the computed marker ID matches the marker ID read from the database to a sufficient degree defined by an acceptable reader error metric, the verification processor outputs a signal indicating successful verification.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for verifying at least one item is in a package of a type using a database, comprising:
   a verifier, wherein the verifier verifies that the at least one item is an item of the type by:
      determining a presence or an absence of a plurality of tags at a corresponding plurality of locations on the at least one item using a spectral signature, wherein each tag comprises silica microtags having a complex porous nanostructure, and wherein a first location and a second location are included in the plurality of locations, wherein the determining of the presence or the absence of the plurality of tags at the plurality of locations on the at least one item comprises:
         determining a presence or an absence of a first tag at the first location to obtain a first result based on the spectral signature;
         determining a presence or an absence of a second tag at the second location to obtain a second result based on the spectral signature; and
         determining placement of the first tag at the first location and placement of the second tag at the second location based on an image using an imager;
      concatenating determination results of the first location and the second location of the plurality of locations to obtain an identifier, wherein the concatenating of the determination results includes concatenating the first result and the second result to obtain the identifier; and
      determining that the at least one item corresponds to the item of the type in response to a determination that goods information associated with the identifier matches goods information associated with the item of the type read from the database, wherein a producer produces the item of the type and provides the database with the identifier, wherein the determining that the at least one item corresponds to the item of the type comprises:
         looking up the goods information in the database based on the identifier.

2. A system as in claim 1, wherein the identifier for the at least one item is based at least in part on a number encoded in a reflectance spectra of the each tag.

3. A system as in claim 1, wherein the goods information comprises one or more of the following: an ingredient, a SKU number, identifier, physical characteristic, physical weight, physical dimension, physical volume, and nutrition information.

4. A system as in claim 1, wherein the database stores a marker identifier.

5. A system as in claim 1, wherein the database stores an optical signature of a tag.

6. A system as in claim 1, wherein the database stores encoded information relating to one or more of the following: a spectral response of a tag associated with an item, a tag shape, and a tag placement information.

7. The system as in claim 1, wherein the producer produces a package for the item of the type, wherein the package is associated with the identifier.

8. A method for verifying at least one item is in a package of a type using a database, comprising:
   providing a verification, using a processor, that the at least one item is an item of the type by:
      determining a presence or an absence of a plurality of tags at a corresponding plurality of locations on at least one item using a spectral signature, wherein each tag on the plurality of locations each comprises silica microtags having a complex porous nanostructure, and wherein a first location and a second location are included in the plurality of locations, wherein the determining of the presence or the absence of plurality tags at the corresponding plurality of locations on the at least one item comprises:
         determining a presence or an absence of a first tag at the first location to obtain a first result based on the spectral signature;

determining a presence or an absence of a second tag at the second location to obtain a second result based on the spectral signature; and determining placement of the first tag at the first location and placement of the second tag at the second location based on an image using an imager;

concatenating determination results of the first location and the second location of the plurality of locations to obtain an identifier, wherein the concatenating of the determination results includes concatenating the first result and the second result to obtain the identifier; and determining that the at least one item corresponds to the item of the type in response to a determination that goods information associated with the identifier matches goods information associated with the item of the type read from the database, wherein a producer produces the item of the type and provides the database with the identifier, wherein the determining that the at least one item corresponds to the item of the type comprises:

looking up the goods information in the database based on the identifier.

9. A method as in claim 8, wherein the identifier for the at least one item is based at least in part on a number encoded in a reflectance spectra of the tags.

10. A method as in claim 8, wherein the goods information comprises one or more of the following: an ingredient, a SKU number, identifier, physical characteristic, physical weight, physical dimension, physical volume, and nutrition information.

11. A method as in claim 8, wherein the database stores a marker identifier.

12. A method as in claim 8, wherein the database stores an optical signature of a tag.

13. A method as in claim 8, wherein the database stores encoded information relating to one or more of the following: a spectral response of a tag associated with an item, a tag shape, and a tag placement information.

14. A computer program product for verifying that at least one item is in a package of a type using a database, the computer program product being embodied in a non-transitory computer readable storage medium and comprising computer instructions for:

providing a verification, using a processor, that the at least one item is an item of the type by:

determining a presence or an absence of a plurality of tags at a corresponding plurality of locations on at least one item using a spectral signature, wherein each tag on the plurality of locations each comprises silica microtags having a complex porous nanostructure, and wherein a first location and a second location are included in the plurality of locations, wherein the determining of the presence or the absence of plurality tags at the corresponding plurality of locations on the at least one item comprises:

determining a presence or an absence of a first tag at the first location to obtain a first result based on the spectral signature;

determining a presence or an absence of a second tag at the second location to obtain a second result based on the spectral signature; and determining placement of the first tag at the first location and placement of the second tag at the second location based on an image using an imager;

concatenating determination results of the first location and the second location of the plurality of locations to obtain an identifier, wherein the concatenating of the determination results includes concatenating the first result and the second result to obtain the identifier; and determining that the at least one item corresponds to the item of the type in response to a determination that goods information associated with the identifier matches goods information associated with the item of the type read from the database, wherein a producer produces the item of the type and provides the database with the identifier, wherein the determining that the at least one item corresponds to the item of the type comprises:

looking up the goods information in the database based on the identifier.

15. The computer program product recited in claim 14, wherein the identifier for the at least one item is based at least in part on a number encoded in a reflectance spectra of the each tag.

16. The computer program product recited in claim 14, wherein the goods information comprises one or more of the following: an ingredient, a SKU number, identifier, physical characteristic, physical weight, physical dimension, physical volume, and nutrition information.

17. The computer program product recited in claim 14, wherein the database stores a marker identifier.

18. The computer program product recited in claim 14, wherein the database stores an optical signature of a tag.

19. The computer program product recited in claim 14, wherein the database stores encoded information relating to one or more of the following: a spectral response of a tag associated with an item, a tag shape, and a tag placement information.

20. A system for verifying at least one item is in a package using a database, comprising:

a verifier, wherein the verifier verifies that the at least one item is an item by:

determining a presence or an absence of a plurality of tags at a corresponding plurality of locations on the at least one item using a spectral signature, wherein each tag comprises silica microtags having a complex porous nanostructure, and wherein a first location and a second location are included in the plurality of locations, wherein the determining of the presence or the absence of plurality tags at the corresponding plurality of locations on the at least one item comprises:

determining a presence or an absence of a first tag at the first location to obtain a first result based on the spectral signature;

determining a presence or an absence of a second tag at the second location to obtain a second result based on the spectral signature; and determining placement of the first tag at the first location and placement of the second tag at the second location based on an image using an imager;

concatenating determination results of the first location and the second location of the plurality of locations to obtain an identifier, wherein the concatenating of the determination results includes concatenating the first result and the second result to obtain the identifier; and determining that the at least one item corresponds to the item in response to a determination that goods information associated with the identifier matches goods information associated with the item read from the database, wherein a producer produces the item and provides the database with the identifier, wherein the determining that the at least one item corresponds to the item comprises:
  looking up the goods information in the database based on the identifier.

21. A system as in claim 20, wherein the identifier for the at least one item is based at least in part on a number encoded in a reflectance spectra of the each tag.

22. A system as in claim 20, wherein the goods information comprises one or more of the following: an ingredient, a SKU number, identifier, physical characteristic, physical weight, physical dimension, physical volume, and nutrition information.

23. A system as in claim 20, wherein the database stores a marker identifier.

24. A system as in claim 20, wherein the database stores an optical signature of a tag.

25. A system as in claim 20, wherein the database stores encoded information relating to one or more of the following: a spectral response of a tag associated with an item, a tag shape, and a tag placement information.

26. The system as in claim 20, wherein the producer produces a package for the item, wherein the package is associated with the identifier.

27. A method for verifying at least one item is in a package using a database, comprising:
  providing a verification, using a processor, that the at least one item is an item by:
    determining a presence or an absence of a plurality of tags at a corresponding plurality of locations on the at least one item using a spectral signature, wherein each tag comprises silica microtags having a complex porous nanostructure, and wherein a first location and a second location are included in the plurality of locations, wherein the determining of the presence or the absence of plurality tags at the corresponding plurality of locations on the at least one item comprises:
      determining a presence or an absence of a first tag at the first location to obtain a first result based on the spectral signature;
      determining a presence or an absence of a second tag at the second location to obtain a second result based on the spectral signature; and
      determining placement of the first tag at the first location and placement of the second tag at the second location based on an image using an imager;
    concatenating determination results of the first location and the second location of the plurality of locations to obtain an identifier, wherein the concatenating of the determination results includes concatenating the first result and the second result to obtain the identifier; and
    determining that the at least one item corresponds to the item in response to a determination that goods information associated with the identifier matches goods information associated with the item read from the database, wherein a producer produces the item and provides the database with the identifier, wherein the determining that the at least one item corresponds to the item comprises:
      looking up the goods information in the database based on the identifier.

28. A computer program product for verifying at least one item is in a package using a database, the computer program product being embodied in a tangible non-transitory computer readable storage medium and comprising computer instructions for:
  providing a verification, using a processor, that the at least one item is an item by:
    determining a presence or an absence of a plurality of tags at a corresponding plurality of locations on the at least one item using a spectral signature, wherein each tag comprises silica microtags having a complex porous nanostructure, and wherein a first location and a second location are included in the plurality of locations, wherein the determining of the presence or the absence of plurality tags at the corresponding plurality of locations on the at least one item comprises:
      determining a presence or an absence of a first tag at the first location to obtain a first result based on the spectral signature;
      determining a presence or an absence of a second tag at the second location to obtain a second result based on the spectral signature; and
      determining placement of the first tag at the first location and placement of the second tag at the second location based on an image using an imager;
    concatenating determination results of the first location and the second location of the plurality of locations to obtain an identifier, wherein the concatenating of the determination results includes concatenating the first result and the second result to obtain the identifier; and
    determining that the at least one item corresponds to the item in response to a determination that goods information associated with the identifier matches goods information associated with the item read from the database, wherein a producer produces the item and provides the database with the identifier, wherein the determining that the at least one item corresponds to the item comprises:
      looking up the goods information in the database based on the identifier.

\* \* \* \* \*